(12) United States Patent
Pinault et al.

(10) Patent No.: US 7,479,217 B2
(45) Date of Patent: Jan. 20, 2009

(54) SERIES OF HYDROCONVERSION AND STEAM REFORMING PROCESSES TO OPTIMIZE HYDROGEN PRODUCTION ON PRODUCTION FIELDS

(75) Inventors: Mathieu Pinault, Lyons (FR); Thierry Gauthier, Brignais (FR); Stéphane Kressmann, Serezin du Rhone (FR); Arnault Selmen, Jonage (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 400 days.

(21) Appl. No.: 11/302,187

(22) Filed: Dec. 14, 2005

(65) Prior Publication Data

US 2006/0127305 A1 Jun. 15, 2006

(30) Foreign Application Priority Data

Dec. 15, 2004 (FR) .................................. 04 13467

(51) Int. Cl.
*C10G 35/04* (2006.01)
*C10G 47/00* (2006.01)

(52) U.S. Cl. .................. 208/100; 208/102; 208/103; 208/104; 208/105; 208/108; 208/143; 208/133; 208/60; 208/63

(58) Field of Classification Search .................. 208/100, 208/102, 103, 104, 105, 108
See application file for complete search history.

(56) References Cited

U.S. PATENT DOCUMENTS

| | | | |
|---|---|---|---|
| 3,188,179 A | 6/1965 | Gorin | |
| 3,433,732 A | 3/1969 | Leaman | |
| 3,552,924 A | 1/1971 | Hepp | |
| 3,755,137 A * | 8/1973 | Schuman | 208/403 |
| 4,297,204 A | 10/1981 | Schliebener et al. | |
| 4,308,128 A * | 12/1981 | Cummings | 208/86 |
| 4,332,666 A * | 6/1982 | Bauman et al. | 208/412 |
| 4,338,182 A * | 7/1982 | Vernon et al. | 208/412 |
| 4,345,989 A * | 8/1982 | Vernon et al. | 208/419 |
| 4,400,263 A * | 8/1983 | Kydd et al. | 208/408 |
| 4,579,985 A | 4/1986 | Minderhoud et al. | |
| 5,132,007 A * | 7/1992 | Meyer et al. | 208/427 |
| 6,436,279 B1 * | 8/2002 | Colyar | 208/108 |
| 6,620,313 B1 * | 9/2003 | Demmin et al. | 208/112 |
| 7,238,273 B2 * | 7/2007 | Chen et al. | 208/49 |

FOREIGN PATENT DOCUMENTS

| | | |
|---|---|---|
| EP | 0 103 948 A | 3/1984 |
| GB | 1 092 420 A | 11/1967 |

* cited by examiner

*Primary Examiner*—Tam M Nguyen
(74) *Attorney, Agent, or Firm*—Millen, White, Zelano & Branigan, P.C.

(57) ABSTRACT

The invention concerns a process for treating a hydrocarbon feed comprising a series of a first upstream process for hydrocarbon hydroconversion comprising at least one reaction chamber, the reaction or reactions occurring inside said chambers and employing at least one solid phase, at least one liquid phase and at least one gas phase, and a second downstream steam reforming process comprising at least one reaction chamber, characterized in that the said upstream process is carried out in a "slurry" and/or an ebullated bed mode and in that the downstream process comprises a first step for at least partial conversion of hydrocarbons heavier than methane into methane, termed the pre-reforming step, and in that the reaction or reactions occurring inside the chambers of the downstream stream reforming process enables the production of a reagent, namely hydrogen, which is necessary for the reactions in the first upstream process.

18 Claims, 1 Drawing Sheet

SERIES OF HYDROCONVERSION AND STEAM REFORMING PROCESSES TO OPTIMIZE HYDROGEN PRODUCTION ON PRODUCTION FIELDS

FIELD OF THE INVENTION

The invention relates to the fields of conversion and/or treatment of residues from the distillation of oil, liquid hydrocarbon feeds derived from coal liquefaction and crude oil.

1. Aim of the Invention

The present invention relates to a series of two hydrocarbon treatment processes:

the first (hydroconversion) comprising at least one reaction chamber and preferably a succession of reaction chambers, the reaction or reactions occurring inside said chambers employing at least one solid phase, at least one liquid phase and at least one gas phase;

the second (steam reforming) comprising at least one reaction chamber, preferably a succession of reaction chambers, the reaction or reactions occurring inside said chambers enabling a reagent necessary for the chemical reactions in the first process to be produced.

2. Prior Art

"Non-conventional" oil exploitation is in full spate and will continue to grow in future years. Such products have to be treated at the site of their extraction. Such locations are generally in zones far from existing industrial zones, and thus the provision of seriess of processes which can transform such materials without supplying external fluids, inducing transport costs and the construction of infrastructure, is highly desirable. To upgrade such alternative resources (bituminous sand, extra-heavy crude), i.e. either to produce crude termed synthetic crude transportable by oil pipelines, or to produce finished products, large quantities of hydrogen are necessary. This production of hydrogen not only requires investment which is generally expensive, but may also consume part of the exploited feedstock, reducing the final yield from the complex.

In U.S. Pat. No. 3,972,803, the heaviest portion produced after an ebullated bed hydroconversion process (bottom of the vacuum column) is sent to a residue gasification unit to produce light hydrocarbons which supply the furnaces of a steam reforming unit. Said steam reforming unit is intended to produce hydrogen from purge gases from the hydroconversion unit. Although seductive, such a series necessitates a great deal of investment (gasification) and consumes part of the liquid products from the hydroconversion unit as the gasification feed.

U.S. Pat. No. 4,526,676 employs, as the gasification unit feed, a combination of light hydrocarbons in the gas form as well as the heaviest portion produced by the process (bottom of the vacuum column). As in the preceding patent, gasification is necessary. To supply said unit, a unit dedicated to oxygen purification is necessary, which renders installation of such a complex more complicated at the crude extraction site which, it will be recalled, are generally in locations which are difficult to access, distant from industrial centres and communication centres.

British patent GB-1 092 420 describes a process for converting hydrocarbon distillate into upgradable gas. The process combines at least one hydrocracking step with two gasification steps, said two gasification steps being hydrogen-producing steam reforming steps. The effluent leaving the hydrocracking zone is separated into two fractions: a first lighter fraction passes into a first steam reforming zone to produce a gas which is rich in methane and the second heavier fraction passes into a second steam reforming zone to produce a gas which is rich in $H_2$ a portion of which is recycled to the hydrocracking zone.

U.S. Pat. No. 3,552,924 describes a process for producing hydrogen from an excess refining stream comprising compounds containing more than 6 carbon atoms up to heavy oils. The feed is hydrocracked by adding hydrogen to a hydrocracking zone. The hydrocracking effluent is cooled to condense hydrocarbons containing more than 6 carbon atoms. The resulting vapour fraction passes over a steam reforming catalyst through a steam reforming zone to produce carbon monoxide, carbon dioxide and hydrogen, said effluent then passing through a conversion step which transforms carbon monoxide into carbon dioxide and hydrogen and the gaseous effluent from the conversion reaction is separated into a hydrogen stream and a stream of carbon dioxide, a part of the hydrogen stream being recycled to the hydrocracking step.

For other existing solutions described in the literature (for example Biswas A K, Chem Eng World V10 N.4 98-100 April 1975), the hydrogen necessary for the treatment of feeds is manufactured in the steam reformer by a supply of natural gas generally present on the site where the feeds are extracted. Said natural gas may be expensive due to market forces or transport to the remote site for heavy oil production.

The invention can at least partially overcome this disadvantage by using all or part of the light gas produced during hydroconversion to manufacture part or all of the necessary hydrogen. Said gas is produced in the reactors and may be extracted downstream of the various reactors or just after each reactor.

Surprisingly, the Applicant's studies have led to the discovery that a series of hydrocarbon treatment processes, i.e. a hydroconversion/steam reforming series, wherein the reaction or reactions carried out inside the chambers for the second process can produce a reagent, hydrogen, which is necessary for the chemical reactions of the first process, can reduce the cost of treatment of residues from oil distillation, liquid hydrocarbon feeds from coal liquefaction and crude oil, by treating the hydrocarbons in an autonomous manner.

The series of these two processes can in effect provide the complex with hydrogen self sufficiency with a small addition of natural gas or even with no external supply of natural gas (other than for the furnace burners).

DETAILED DESCRIPTION OF THE PROCESS OF THE INVENTION

The invention describes a series of processes which enable the hydrocarbons described at the start of the text to be processed in a completely autonomous manner. This invention is of particular application to fields located in geographical regions which are difficult to reach.

The present invention concerns a series of two hydrocarbon treatment processes:

the first process (upstream) for hydrocarbon hydroconversion comprising at least one reaction chamber, preferably a succession of reaction chambers, the reaction or reactions occurring within said chambers using at least one solid phase, at least one liquid phase and at least one gas phase, said upstream process being carried out in a "slurry" and/or ebullated bed mode. The second (downstream) steam reforming process comprises at least one reaction chamber and preferably a succession of reaction chambers, the reaction or reactions occurring within said chambers of which can produce a reagent, hydrogen, necessary for the chemical reactions in the first process. The second downstream process comprises a first step termed pre-reforming which can at least partially (preferably with a conversion of more than 95%) convert hydrocarbons heavier than methane to methane, increasing the efficacy of the ensemble.

The series of these two processes enables the complex to be self sufficient in hydrogen, with a small addition of natural gas (generally less than 3% by weight with respect to the feed for conversions of about 60% by weight for 540° C.+ compounds and generally less than 1% by weight with respect to the feed for conversions of about 90% by weight of 540° C.+ compounds), or even with no external natural gas addition (apart from that for the furnace burners).

In accordance with the invention, the upstream hydrocarbon conversion process comprises a zone for bringing a liquid feed, a gas feed and solid particles constituting the solid phase into contact, said particles preferably having catalytic activity.

Said solid particles may be dispersed in a suspension immersed in a liquid phase in a lower zone of the chamber, generally termed a "slurry" reactor. The catalytic agent then traverses the reaction zone without being separated from the liquid in the reactor. Although not precisely known, the particle size of the catalytic phase formed in this type of process remains sufficiently small for it to be difficult to fluidize these particles in the reaction zone without entraining them with the liquid (generally of the order of 100 μm, preferably less than 10 μm). In this implementation in a slurry reactor, the catalyst (solid catalytic particles) is generally continuously introduced into the reactor with the fresh feed and is constituted by a soluble element containing one or more metals which can sulphurize under the conditions of the process.

Said solid particles may also be present in an ebullated bed. The ebullated bed process employs a supported catalyst containing at least one metallic element the catalytic action of which takes place in the sulphide form, with a size which is such that the catalyst remains mainly in the reactor. The liquid flow rate in the reactor allows said catalyst to be fluidized but cannot entrain it outside the reaction zone with the liquid effluents. Continuous addition and withdrawal of catalyst is possible and can compensate for deactivation of the catalyst.

The upstream hydroconversion process is also implemented by a combination of the slurry mode and the ebullated bed mode by injecting fine particles or fine particle precursors into the liquid feed upstream of the reactor and passing them into the reactor functioning in ebullated bed mode.

Highly preferably, the catalyst contains molybdenum.

Examples of reactors functioning in accordance with slurry bed and ebullated bed principles and their principal applications have been described in "Chemical reactors", P Trambouze, H Van Landeghem and J P Wauquier, published by Technip (1988).

More particularly, but not in a limiting manner, the present invention is of application in converting a feed introduced into said chamber in the liquid form and containing hydrocarbons, said conversion occurring by means of reaction with a gas phase comprising hydrogen (hydroconversion) in the presence of a solid phase which usually has catalytic activity.

In a highly preferred implementation, the series concerns a hydroconversion process preferably carried out in an ebullated bed followed by steam reforming of the purge gas at the hydrogen purification step included in the hydroconversion process.

Feedstocks

The feeds processed in the present invention are selected from the following:
atmospheric residues;
straight run vacuum residues;
deasphalted residues;
residues from conversion processes, such as those from coking;
liquid hydrocarbon feeds derived from coal liquefaction;
crude oil (in particular extra-heavy);
bitumen extracted from schist or bituminous sand fields;
liquid feeds derived from fixed bed hydroconversion, such as those from HYVAHL® processes for the treatment of heavy feeds, as developed by the Applicant;
liquid feeds from ebullated bed heavy hydrotreatment processes, such as those from H-OIL® processes;
solvent deasphalted oil, for example using propane, butane or pentane;
asphalt (alone or as a mixture) normally deriving from deasphalting vacuum residues from straight run distillation or vacuum residues from H-OIL® or HYVAHL® processes, used alone or diluted with a hydrocarbon fraction or a mixture of hydrocarbon fractions selected from the group formed by light cycle oil (LCO), heavy cycle oil (HCO), decanted oil (DO), residual fractions from cracking processes which may contain fine suspensions of catalyst (slurry), and gas oil fractions, in particular those obtained by vacuum distillation, termed VGO (vacuum gas oil).

They may also contain:
gas oil and heavy gas oil cuts deriving from catalytic cracking, generally with a distillation range of about 150° C. to about 370° C. or 600° C. or to more than 600° C.;
aromatic extracts obtained in the context of lubricating oil manufacture;
effluents from biomass treatment processes.

The feeds may also be formed by mixing the various fractions in any proportions.

In the present invention, the feeds which are treated are atmospheric residues, vacuum residues or mixtures of said residues. Preferably, the feeds which are treated are crude oil (in particular extra heavy oil) or bitumens extracted from bituminous sand or schist fields or mixtures thereof.

Said feeds are characterized in that they contain a non negligible quantity of heavy metals such as nickel or vanadium, the metal content typically being more than 5 ppm and preferably in the range 20 to 1000 ppm, highly preferably in the range 50 to 500 ppm. A feed containing such a quantity of heavy metals is a characteristic of a feed constituted by residues. Thus, because of their properties, said feeds are termed residues.

Residues are characterized by a fraction boiling at a temperature of more than 565° C., which can be demonstrated by vacuum distillation of the residue or by modem distillation techniques simulated by chromatography. The fraction boiling at temperatures of more than 565° C. is generally more than 10% by weight of the total fraction, preferably more than 50% by weight.

During the hydroconversion process, said metals are deposited on the catalysts, accumulating thereon and deactivating them. Thus, fresh catalyst (without metals) has to be added regularly to maintain the catalytic activity. This addition of catalyst is easily effected if the reaction is carried out in an ebullated bed and/or slurry. The slurry and/or ebullated bed mode allows fresh catalyst containing no metals to be added and catalyst containing metals to be withdrawn continuously.

Said feeds are also characterized in that they contain non negligible quantities of asphaltene, i.e. a weight content of more than 0.5%, preferably a content in the range 2% to 20% and highly preferably in the range 3% to 15%.

Thus, it is important to take precautions to limit catalyst coking phenomena which also result in its deactivation. To this end, it is advantageous to limit the acidity of the catalytic support by employing low or moderate acidity supports, such as the majority of aluminas.

Operating Conditions

First Treatment Zone (Upstream)

The operating conditions of the process operated in the first (upstream) hydrocarbon treatment zone are conditions which are favorable to hydroconversion, i.e. a total pressure of 80 to 500 bars, preferably 100 to 500 bars, and highly preferably 100 to 200 bars, with a partial pressure of hydrogen of 10 to 500 bars, preferably 20 to 300 bars, with a temperature of 300° C. to 600° C., and preferably 350° C. to 500° C., contact being carried out for a certain time period necessary for residue conversion of 5 minutes to 20 hours, preferably in the range 1 to 10 hours. Depending on the application, part of the heavy fractions of the effluents with a boiling point substantially equal to or higher than the feed may be recycled with the feed by a distillation fractionation, for example of the effluent downstream of the reaction zone or the process (downstream of the last reaction zone of the first process).

Second Treatment Zone (Downstream)

The operating conditions of the process operated in the second downstream steam reforming treatment zone are those conventionally employed, i.e. a general pressure of 10 to 50 bars absolute (preferably 25 bars) and a temperature which increases gradually as the conversion furnace is approached, i.e. in the case of steam reforming, from 350° C. at the sulphur-containing compound hydrogenation step, to 550° C. at the pre-reforming step and 850° C. at the reforming furnace step.

SUMMARY OF THE INVENTION

The invention concerns a process for treating a hydrocarbon feed comprising a series of a first upstream process for hydrocarbon hydroconversion comprising at least one reaction chamber, the reaction or reactions occurring inside said chambers and employing at least one solid phase, at least one liquid phase and at least one gas phase, and a second downstream steam reforming process comprising at least one reaction chamber. The upstream process is carried out either in a "slurry" mode or an ebullated bed mode or a combination of the two modes. In the downstream process, the reaction or reactions occurring inside said chambers can produce a reagent, hydrogen, which is necessary for the reactions in the first process, and said second downstream process comprises a first step termed a pre-reforming step which can at least partially convert, preferably by more than 95%, hydrocarbons heavier than methane into methane, to increase the efficiency of the ensemble.

Preferably, the upstream process comprises a zone for bringing a liquid feed, a gas feed and solid particles into contact. The solid particles are then dispersed in a suspension immersed in a liquid phase in a lower zone of the contact zone (slurry reactor) or they may be present in an ebullated bed, or a combination of these two modes is used.

Preferably, in the ebullated bed implementation, the process employs a supported catalyst containing at least one metallic element.

In the slurry reactor implementation, the catalyst (solid catalytic particles) is generally continuously introduced into the reactor with the fresh feed and is constituted by a soluble element containing one or more metals which may become sulphurized under the process conditions.

Highly preferably, the solid catalyst particles contain molybdenum.

The hydrocarbon feed is generally selected from atmospheric residues, straight run residues, deasphalted residues, residues from a conversion process, liquid hydrocarbon feeds derived from coal liquefaction, crude oil, bitumen extracted from bituminous sand or schists, liquid feeds from fixed bed hydroconversion, liquid feeds from ebullated bed heavy feed hydrotreatment processes, solvent deasphalted oils, asphalts—alone or diluted by a hydrocarbon fraction or a mixture of hydrocarbon fractions selected from the group formed by light cycle oils, heavy cycle oils, decanted oils, residual fractions from cracking processes which may contain suspensions of catalyst fines (slurry) and gas oil fractions-, gas oil and heavy gas oil cuts from catalytic cracking, aromatic extracts obtained from lubricating oil manufacture, and effluents from biomass treatment processes, used alone or as a mixture.

The operating conditions for the first hydrocarbon treatment zone (upstream) are generally a total pressure of 80 to 500 bars, a partial pressure of hydrogen of 10 to 500 bars, and a temperature of 300° C. to 600° C., contact being carried out for a time of 5 min to 20 hours.

The operating conditions in the second hydrocarbon treatment zone (downstream) are generally a pressure of 10 to 50 bars absolute and a temperature which increases as the conversion furnace is approached.

Advantageously, part of the residual effluent fractions is recycled with the feed by effluent distillation fractionation downstream of the last reaction zone of the upstream process, recycling thus being constituted by a part of the liquid obtained from the column bottom.

DETAILED DESCRIPTION OF FIG. 1

Figure 1:
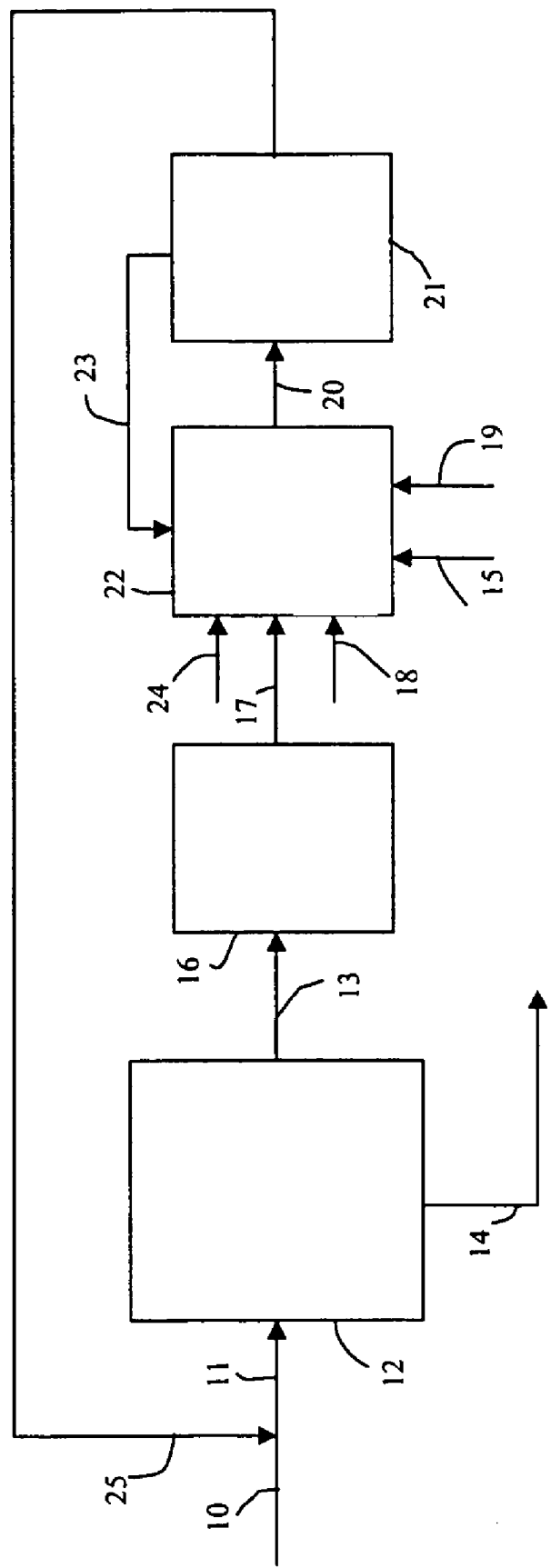
FIG. 1 diagrammatically illustrates an example of the invention comprising a series of an ebullated bed hydroconversion unit and a purge gas steam reforming unit for the gas derived from the hydrogen purification unit. Said purge gas steam reforming unit and a makeup of natural gas provides self sufficiency in hydrogen for the hydroconversion/steam reforming complex. Depending on the degree of conversion, the complex may even be self-sufficient in natural gas.

FIG. 1 illustrates the particular, but non limiting, case of a unit 12 for hydroconversion of a heavy hydrocarbon feed 10 in the presence of hydrogen ($H_2$) and catalytic particles in one or more ebullated beds. The effluent from the last reactor is separated into a liquid phase and a vapour phase in a separator drum. The liquid phase containing the heaviest compounds is then depressurized, cooled and sent to a separation string, not shown in FIG. 1 (stream 14). The vapour phase is depressurized, cooled and separated at several successive pressures and temperatures. The liquid streams recovered at each separation are collected into stream 14 cited above. A portion of the vapour phase is recycled to the reactors, generally after amine treatment to reduce the $H_2S$ content, while the remaining vapour phase is depressurized to about 30 bars absolute and purified to remove the $H_2S$ present (in generally by amine washing). The gas is then purified to obtain a gas with a hydrogen purity of about 99.5% mol, generally by an absorption-desorption process. The non purified portion of said gas (stream 13) is sent to a steam reforming process (16, 22, 21). Said stream comprises light hydrocarbons, hydrogen and also sulphur-containing compounds. The sulphur of said sulphur-containing compounds is a poison for the steam reforming catalyst and is transformed into $H_2S$ then captured at level 16. The quantity of hydrogen contained in the stream 13 is generally sufficient to transform said sulphur-containing compounds but a makeup is possible if necessary. Typical compounds contained in said stream 13 are light hydrocarbons ($C_1$ to $C_5$, but also traces of sulphur-containing compounds, for example mercaptans with boiling points close to the major hydrocarbon compounds). However, this stream may also be constituted by $C_1$ to $C_3$ or $C_1$ to $C_2$ or even $C_1$ compounds alone.

In the case described in FIG. 1, the light hydrocarbons free of sulphur-containing compounds (stream 17) are sent to the pre-reformer followed by the steam reformer (included in unit 22) along with natural gas (stream 18) and steam (stream 24). The furnaces of unit 22 are supplied with natural gas (stream 15) which is available on site, as well as the air necessary for combustion (stream 19). The stream 20 leaving the steam reformer contains hydrogen in large quantities, but also carbon monoxide, carbon dioxide and light untransformed hydrocarbons. Thus, said stream 20 has to be purified in a hydrogen purification unit (absorption-desorption type), unit 21. The stream 25 leaving the unit 21 is constituted by hydrogen with a purity of about 99.5% mol, which is then compressed and returned to the hydroconversion unit inlet (stream 11, feed-hydrogen mixture). In unit 21, the stream 23 resulting from hydrogen purification is returned to the steam reforming furnaces in unit 22.

This series of units allows the feeds described to be treated using a hydroconversion process which is self-sufficient in hydrogen and which is highly advantageous for units installed on or near production fields.

The following comparison of three examples demonstrates the advantages of the present invention. Example 1 illustrates the results obtained for a hydroconversion unit functioning at a degree of conversion of 60% for compounds having a bubble point of more than 540° C. at an atmospheric pressure. Example 2 illustrates the application of the invention to a unit functioning in hydroconversion mode at a degree of conversion of 90%. Example 3 illustrates a unit functioning at 95% hydroconversion.

These examples are derived from experiments carried out in pilot units functioning in ebullated bed mode. Other experiments were carried out in a slurry type reactor and the same results were obtained.

EXAMPLE 1

Unit Functioning at 60% Conversion of 540° C.+

Heavy vacuum residue (VR) from the Persian Gulf was treated. The density at 15° C. was 1.048. All yields were calculated on the basis of 100 (by weight) of VR.

This Safaniya vacuum residue was treated in a pilot unit comprising two reactors in series functioning as ebullated beds. The total volume of each reactor was 2.24 litres.

This pilot unit simulated an industrial ebullated bed vacuum residue H-Oil® unit. The fluids were in upflow mode in this reactor, as in an industrial unit. Internal recycling of the liquid allowed the catalyst to be ebullated in the reactor.

The operating conditions were as follows:
feed flow rate: 1.4 l/h;
total pressure: 156 bars absolute;
hydrogen flow rate: 840 l/h (i.e. about 13 l/h under conditions);
temperature in reactors: 410° C.;
flow rate of liquid recycled to reactor: 30 l/h.

The results below are expressed as the percentage by weight with respect to fresh feed:

| | |
|---|---|
| Consumption of hydrogen necessary for conversion | 1.6% |
| Fuel gas produced in hydroconversion unit | 3.5% |

Composition of fuel gas (from hydroconversion unit) sent to steam reforming unit (mol %) after purification and separation of sulphur-containing products:

| | |
|---|---|
| Methane | 28.4% |
| Ethane | 13.3% |
| Propane | 12.2% |
| Butane | 7.8% |
| Hydrogen | 38.3% |
| TOTAL | 100.0% |

Composition of natural gas sent as makeup to steam reforming unit (functioning at a pressure of 30 bars absolute) (mol %):

| | |
|---|---|
| Methane | 96.0 |
| Ethane | 4.0 |

To provide the hydrogen production necessary for the desired degree of conversion, the makeup natural gas flow rate represented 2.2% by weight of the fresh feed to the hydroconversion unit, i.e. about 35% by weight of the gas necessary for hydrogen production.

The production of hydrogen from steam reforming the fuel gas deriving from hydroconversion and a makeup of natural gas thus made the complex self-sufficient at this degree of conversion.

EXAMPLE 2

Unit Functioning at 90% Conversion of 540° C.+

The fuel gas from the hydroconversion unit represented, at this degree of conversion, 9.5% by weight of the fresh feed to the hydroconversion unit. Said fuel gas contained hydrogen which is used during conversion of sulphur-containing compounds (and their capture) upstream of the pre-reformer and reformer. A very small quantity of natural gas was added.

The composition of the gas mixture sent to the pre-reformer (purified fuel gas+natural gas+steam) was as follows (mol %):

| | |
|---|---|
| Methane | 6.7% |
| Ethane | 2.9% |
| Propane | 2.6% |
| Butane | 1.7% |
| Steam | 77.9% |
| Hydrogen | 8.2% |
| TOTAL | 100.0% |

The quantity of steam introduced before the pre-reformer was such that the $H_2O/C$ mole ratio before the reforming furnace was at least 3.1. The pressure in the steam reforming unit was 30 bars absolute.

The composition of the gas at the pre reformer outlet was as follows (the reactions took place at 550° C.):

| | |
|---|---|
| Methane | 20.0% |
| Ethane | traces |
| Propane | traces |
| Butane | traces |
| Steam | 62.3% |
| Hydrogen | 13.3% |
| $CO_2$ | 4.4% |
| TOTAL | 100.0% |

The gas was then introduced into the reforming furnace at a temperature of 840° C.; the furnace outlet gas had the following composition (mol %):

| | |
|---|---|
| Methane | 3.7% |
| Ethane | traces |
| Propane | traces |
| Butane | traces |
| Steam | 33.7% |
| Hydrogen | 47.4% |
| CO | 9.7% |
| $CO_2$ | 5.5% |
| TOTAL | 100.0% |

After purification of the effluent at the outlet from the reforming furnace, the hydrogen produced represented 2.7% by weight of the feed under consideration, ensuring self sufficiency of hydrogen in the hydroconversion process.

At 90% conversion of 540° C.+ compounds, a consumption of only 0.5% by weight (with respect to the fresh feed at the hydroconversion inlet) of natural gas produced self-sufficiency in hydrogen in the complex (i.e. about 3% by weight of the gas necessary for hydrogen production).

EXAMPLE 3

Unit Functioning at 95% Conversion of 540° C.+

The fuel gas from the hydroconversion unit represented 11.8% by weight of the fresh feed at this degree of conversion. Said fuel gas contained hydrogen which was used during the conversion of sulphur-containing compounds (and their capture) upstream of the pre-reformer and the reformer.

The composition of the mixture of gas sent to the pre-reformer (purified fuel gas+steam) was as follows (mol %):

| | |
|---|---|
| Methane | 6.2% |
| Ethane | 2.9% |
| Propane | 2.7% |
| Butane | 1.7% |
| Steam | 78.1% |
| Hydrogen | 8.4% |
| TOTAL | 100.0% |

The quantity of steam introduced before the pre-reformer was such that the mole ratio $H_2O/C$ before the reforming furnace was at least 3.1. The pressure at the unit inlet was 30 bars absolute.

The composition of the gas at the pre-reformer outlet (the reactions occurred at 550° C.) was as follows (mol %):

| | |
|---|---|
| Methane | 20.0% |
| Ethane | traces |
| Propane | traces |
| Butane | traces |
| Steam | 62.2% |
| Hydrogen | 13.5% |
| $CO_2$ | 4.3% |
| TOTAL | 100.0% |

The gas was then introduced to the reforming furnace at a temperature of 840° C. The gas at the furnace outlet had the following composition (mol %):

| | |
|---|---|
| Methane | 3.7% |
| Ethane | traces |
| Propane | traces |
| Butane | traces |
| Steam | 33.7% |
| Hydrogen | 47.4% |
| CO | 9.7% |
| $CO_2$ | 5.5% |
| TOTAL | 100.0% |

After purifying the effluent at the outlet from the reforming furnace, the hydrogen produced represented 3.2% by weight of the feed under consideration, ensuring self-sufficiency in hydrogen for the hydroconversion.

At 95% conversion of 540° C.+ compounds, steam reforming fuel gas from the hydroconversion process allowed the complex to be self sufficient in hydrogen without an external supply of natural gas (apart from to the furnace burners).

The invention claimed is:

1. A process for treating a hydrocarbon feed comprising:
   a first upstream process for hydrocarbon hydroconversion comprising passing a hydrocarbon feed into at least one reaction chamber, conducting at least one reaction inside at least one chamber in the presence of at least one solid catalytic phase, at least one hydrocarbon phase and at least one hydrogen-containing gaseous phase to obtain at least one hydroconverted gaseous stream comprising hydrocarbons heavier than methane, said at least one reaction being conducted in a "slurry" and/or an ebullated bed mode,
   a second upstream process comprising:
   passing said at least one hydroconverted gaseous stream comprising hydrocarbons heavier than methane to a first pre-forming step for partial conversion of hydrocarbons to hydrogen and for at least partial conversion of hydrocarbons heavier than methane into methane, and passing resultant gaseous stream from said first pre-reforming step to a steam reforming step for conversion of resultant methane from the pre-reforming step into hydrogen, and
   at least partially recycling hydrogen to said first upstream process.

2. A process according to claim 1, wherein the first upstream process comprises a zone for bringing a liquid feed, a gas feed and solid particles into contact.

3. A process according to claim 1, wherein the first upstream process is conducted in said slurry reactor bed solid particles employed in the slurry reactor are catalytic particles introduced continuously into the reactor with fresh feed and are constituted by a soluble element containing one or more metals which can sulphurize under the process conditions.

4. A process according to claim 1, said first upstream process functioning in an ebullated bed mode employing a supported catalyst containing at least one metallic element.

5. A process according to claim 2, wherein the solid catalyst particles contain molybdenum.

6. A process according to claim 1, wherein the hydrocarbon feed contains a heavy metals content of more than 5 ppm.

7. A process according to claim 6, wherein the hydrocarbon feed contains a heavy metals content in the range 20 to 1000 ppm.

8. A process according to claim 6, wherein the hydrocarbon feed contains a heavy metals content in the range 50 to 500 ppm.

9. A process according to claim 7, wherein the hydrocarbon feed is selected from atmospheric residues, straight run residues, heavy vacuum residues, deasphalted residues, residues from a conversion process, crude oil, bitumen extracted from bituminous sands or schists, liquid feeds from fixed bed hydroconversion, liquid feeds from ebullated bed heavy feed hydrotreatment processes, solvent deasphalted oils, asphalts, alone or diluted by a hydrocarbon fraction or a mixture of hydrocarbon fractions selected from the group formed by light cycle oils, heavy cycle oils, decanted oils, residual fractions from cracking processes which may contain slurries of catalyst fines and gas oil fractions, gas oil and heavy gas oil cuts from catalytic cracking, aromatic extracts obtained from lubricating oil manufacture, and effluents from biomass treatment processes, used alone or as a mixture.

10. A process according to claim 7, wherein the hydrocarbon feed is a liquid hydrocarbon derived from coal liquefaction.

11. A process according to claim 1, wherein the operating conditions in the first upstream process are: a total pressure of 80 to 500 bars, with a partial pressure of hydrogen of 10 to 500 bars, and a temperature of 300° C. to 600° C., contact being made for a period of 5 minutes to 20 hours.

12. A process according to claim 1, wherein the operating conditions in the second downstream process are: a pressure of 10 to 50 bars absolute and a temperature which increases as the conversion furnace is approached.

13. A process according to claim 1, said first upstream process comprising a last reaction zone, further comprising passing effluent from the last reaction zone of the first upstream process to a distillation column and withdrawing liquid from the column bottom and recycling said liquid with the hydrocarbon feed to the first upstream process.

14. A process according to claim 1, wherein the first upstream process is conducted in both the slurry mode and the ebullated bed mode, wherein a slurry of catalyst and feed is fed to said ebullated bed.

15. A process according to claim 1, wherein the pre-reforming step is conducted so as to convert more than 95% of hydrocarbons heavier than methane to methane.

16. A process according to claim 14, wherein pre-reforming step is conducted so as to convert more than 95% of hydrocarbons heavier than methane to methane.

17. A process according to claim 1, wherein the pre-reforming step is conducted at a reaction temperature of about 550° C.

18. A process according to claim 15, wherein the pre-reforming step is conducted at a reaction temperature of about 550 ° C.

* * * * *

UNITED STATES PATENT AND TRADEMARK OFFICE
CERTIFICATE OF CORRECTION

PATENT NO. : 7,479,217 B2
APPLICATION NO. : 11/302187
DATED : January 20, 2009
INVENTOR(S) : Pinault et al.

It is certified that error appears in the above-identified patent and that said Letters Patent is hereby corrected as shown below:

On the title page, item (54): "Lyons (FR)" should read --Lyon (FR)--.

Column 12, line 11, reads "process comprasing a last reaction zone, further comprising", should read --process comprising a last reaction zone, further comprising--.

Signed and Sealed this

Twenty-second Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,479,217 B2  
APPLICATION NO. : 11/302187  
DATED : January 20, 2009  
INVENTOR(S) : Pinault et al.

Page 1 of 1

It is certified that error appears in the above-identified patent and that said Letters Patent is hereby corrected as shown below:

On the title page, item (75): "Lyons (FR)" should read --Lyon (FR)--.

Column 12, line 11, reads "process comprasing a last reaction zone, further comprising", should read --process comprising a last reaction zone, further comprising--.

This certificate supersedes the Certificate of Correction issued September 22, 2009.

Signed and Sealed this

Twenty-seventh Day of October, 2009

David J. Kappos  
*Director of the United States Patent and Trademark Office*